C. G. SMITH & J. SLEPIAN.
ELECTROMAGNETIC SHIP'S LOG.
APPLICATION FILED DEC. 20, 1915.
1,249,530.  Patented Dec. 11, 1917.
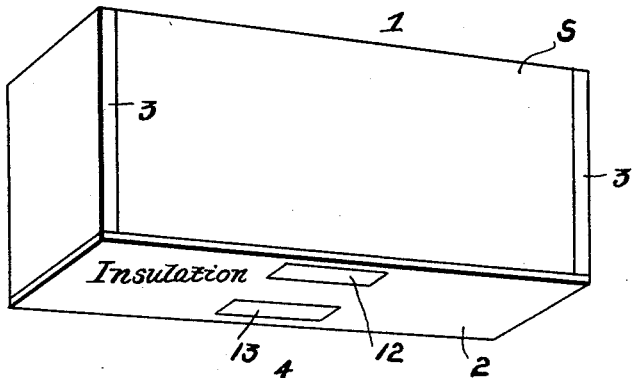
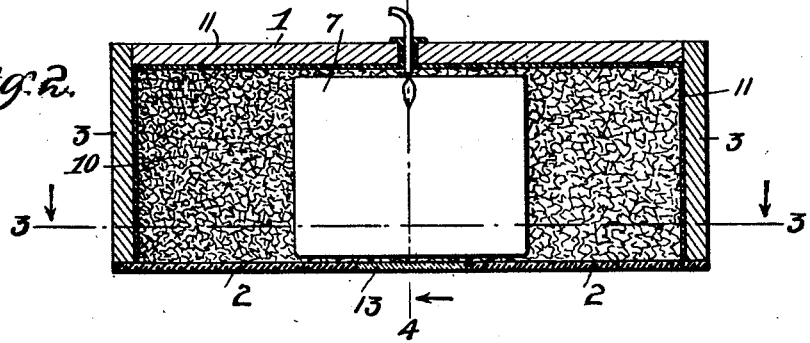
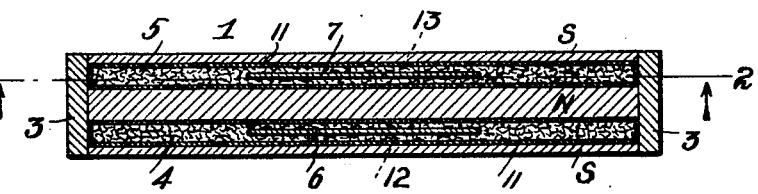
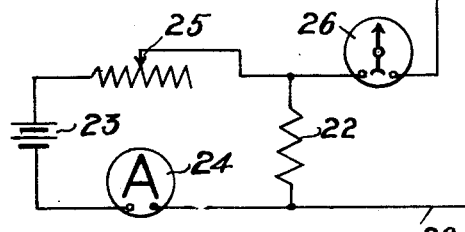
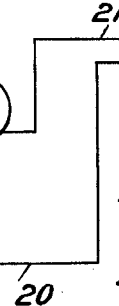
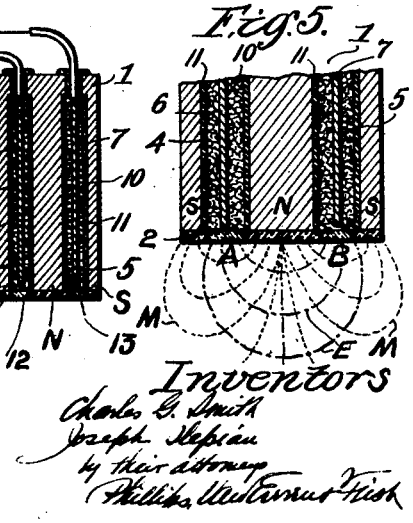
Inventors
Charles G. Smith
Joseph Slepian
by their attorneys

UNITED STATES PATENT OFFICE.

CHARLES G. SMITH, OF CAMBRIDGE, AND JOSEPH SLEPIAN, OF BOSTON, MASSACHUSETTS.

ELECTROMAGNETIC SHIP'S LOG.

1,249,530.   Specification of Letters Patent.   Patented Dec. 11, 1917.

Application filed December 20, 1915. Serial No. 67,821.

*To all whom it may concern:*

Be it known that we, CHARLES G. SMITH and JOSEPH SLEPIAN, citizens of the United States, residing at Cambridge, county of Middlesex, Commonwealth of Massachusetts, and Boston, county of Suffolk, and Commonwealth of Massachusetts, respectively, have invented certain new and useful Improvements in Electromagnetic Ships' Logs; and we do hereby declare the following to be a full, clear, and exact description of the invention, such as will enable others skilled in the art to which it appertains to make and use the same.

The present invention relates to electromagnetic ships' logs and a method of measuring the speed of a ship.

A magnet is placed on the ship's bottom so that the magnetic flux passes through the sea water. The magnetic flux traveling with the ship through the water generates a difference of electric potential in the water directly proportional to the velocity of the ship. These differences of electric potential are measured and from them the speed of the ship is determined.

In the drawings which illustrate the preferred embodiment of the invention, Figure 1 is a perspective view of the inclosed magnet and electrodes, the lower face of which is exposed to the water; Fig. 2 is a longitudinal section taken on the line 2—2 of Fig. 3; Fig. 3 is a longitudinal section taken along the line 3—3 of Fig. 2; Fig. 4 is a wiring diagram of the electrical connections and also shows a section along the line 4—4 of Fig. 2; and Fig. 5 is a fragmentary section along the line 4—4 of Fig. 2 showing the distribution of the magnetic flux and the direction of the induced electromotive force.

In the illustrated embodiment of the invention the magnetic flux is furnished by a permanent magnet 1, having a middle pole N and two side poles S. The magnet poles are long and narrow. The magnet is arranged in the ship's bottom so that the lower face of the magnet is next to the water. The magnet is insulated from the ship's bottom and the lower face of the magnet is insulated from the water by a plate of insulating material 2. The ends of the magnets are closed by plates 3 of non-magnetic material. In the cavities 4 and 5 between the poles of the magnet are located electrodes 6 and 7 of amalgamated zinc. The cavities around the zinc electrodes are packed with zinc sulfate 10. The cavities are lined with insulated linings 11. In the insulating plate 2 are plates or windows 12 and 13 of porous earthenware through which the water can seep to form an electrical connection betwen the sea water and the zinc electrodes 6 and 7 in the cavities 4 and 5 respectively. While porous earthenware windows 12 and 13 allow an electrical connection through them, they do prevent any considerable diffusion through them of the zinc sulfate so that the device may be used a long time before the zinc sulfate has to be renewed. Amalgamated zinc, surrounded by the zinc sulfate, forms a nonpolarizable electrode even though the chemicals used may be somewhat impure, the zinc sulfate forming a concentrated solution around the metallic zinc.

The magnet is so located that the movement of the magnet through the water takes place in a direction parallel to the plane of the plates 6 and 7. The lines M of magnetic flux, as shown in Fig. 5, pass from the middle pole N to the side poles S forming a magnetic field which is moved through the water in a direction perpendicular to the plane of the paper in Fig. 5, the magnetic field being transverse to the direction of movement of the magnet. The movement of this magnetic field causes a difference of potential between the points A and B in the water at the surfaces of the earthenware windows 12 and 13, the direction of the electromotive force being indicated by the lines E. Since the windows 12 and 13 are porous and conducting, and the electrodes 6 and 7 are carried along with the magnet, the electrodes 6 and 7 should be maintained at substantially the same potential as the points A and B, provided the electrical resistance through the porous windows between the electrodes 6 and 7 is small or the current flowing between the electrodes is small or zero.

In order to measure the difference in electromotive force induced between the points A and B, the electrodes 6 and 7 are connected through wires 20 and 21 to the terminals of a low resistance 22. A direct current is maintained through the resistance 22 by means of a battery 23. An ammeter 24 and an adjustable resistance 25 are included in the battery circuit. The resistance 25 is adjusted to vary the current so that the potential drop across the resistance 22 just balances the electromotive force induced between the electrodes 6 and 7 by the movement of the magnetic field M through the water. A zero instrument, such as a galvanometer 26, is placed in one of the leads 20 or 21 and the resistance 25 is adjusted until the galvanometer 26 shows no current passing between the electrodes 6 and 7. The value of the resistance 22 is known and by reading the ammeter the potential drop across the resistance 22 can be computed. This potential drop is equal to the electromotive force induced between the electrodes 6 and 7 by the movement of the magnetic field M through the water. If the magnetic field is known, the induced electromotive force for different speeds of ships may be computed or may be determined experimentally and the ammeter 24 can be calibrated to read directly in knots per hour.

By using the zero method, the effect of variations in the resistance of the water and the porous windows between the electrodes 6 and 7 is eliminated as a source of error.

The electro-dynamic theory upon which the operation of the device is based is as follows:—If a magnetic field move through a medium, electromotive forces are induced in that medium, the intensity of which per unit volume is proportional to the product of the velocity of the field by the component of the magnetic force perpendicular to the direction of motion of the field, and the direction of which electromotive force is perpendicular to the direction of motion of the field and to the lines of force of the field. Using vector notation, E being the vector induced electromotive force in volts per cubic centimeter, H being the vector magnetic force in gausses, V being the vector velocity in centimeters per second, we have $$E = \frac{[V x H]}{10^8}$$

where $x$ indicates vector or geometric multiplication. In a three dimensional conducting medium under a steady state of current flow caused by a volume distribution of electromotive forces, the electric potential is determined as follows: Let E be the vector impressed electromotive force per unit volume; let I be the vector current density per unit area; let R be the scalar specific resistance of the medium; and let the operation $E - RI$ be supposed to be effected in the vector sense. Thus $E - RI$ is a vector having magnitude and direction. Consider any two points C and D in the medium. Draw any path L joining these points. Integrate at each point of the path the component of the vector $E - RI$ which lies along the path into the length of the path, and we get $$\int_C^D (E - RI) \cdot ds$$

where $ds$ is the element of length along the path. The value of this integral is independent of the path L and its magnitude gives the difference in potential between the points C and D.

Referring to Fig. 5 the difference in potential between the points A and B is given by $$\int_A^B (E - RI) \cdot ds$$

taken along any path lying in the water joining the points A and B. It is clear from the above integral that if the term $$\int_A^B E \cdot ds$$

is not to be greatly reduced by the subtraction of the term $$\int_A^B RI \cdot ds$$

there must be very little current flow in the water along any path joining the points A and B. If the magnet 1 were infinitely long in a direction perpendicular to the plane of the paper in Fig. 5, it is clear from considerations of symmetry that no currents would flow in the water due to the motion of the magnet. In this case the difference in potential between the points A and B would be given by $$\int_A^B E \cdot ds$$

If the magnet 1 be of finite length, but long relative to the distance between the poles N and S, then it is clear that, although there will be considerable current flow in the ocean near the ends of the magnet, at the middle portion where we suppose the points A and B to be located the induced electromotive forces are so arranged as to prevent any considerable current flow, that is, any current induced by the electromotive forces near the middle of the magnet must flow through a narrow volume of water longitudinally along the under side of the magnet to the ends of the magnet and would thus have a circuit of high resistance. For this reason, the porous plates of earthenware 12 and 13 through which the electrical connection is established between the water and the electrodes 6 and 7, are placed midway between the ends of the magnet 1 and are made short with relation to the length of the magnet. The distance from the porous plates 12 and 13 to the ends of the magnets is sufficient so that current paths along the under side of the magnet to the ends of the magnet have sufficiently high resistance so that $$\int_A^B RI \cdot ds$$

is small compared with $$\int_A^B E \cdot ds$$

With a magnet about thirty centimeters in length, and about eight centimeters in total width, the electromotive force observed between the electrodes 6 and 7 (which is substantially the same as between the points A and B) is substantially that which would be predicated on the hypothesis that $$\int_A^B RI \cdot ds$$

is zero and the difference of potential between A and B is substantially that given by $$\int_A^B E \cdot ds$$

E—RI is independent of R and will not change with changes in the specific resistance of the sea water. This follows from the fact that I varies inversely as R, and E is independent of R.

One of the difficulties in the practical application of the apparatus lies in the tendency of the electrodes to polarize, particularly if the electromotive force generated by the passage of the magnetic field through the water causes a current to flow through the electrodes, such, for instance, as a current to actuate a volt meter. While the described precautions against polarization are effective and are preferred, other means for preventing polarization may be employed, such, for example, as other chemical depolarizers, interchanging the electrodes by mechanical means, or by using an alternating current method. Likewise, while it is preferred to use the zero method of balancing the electromotive force induced in the water against a potential drop over a resistance, nevertheless, it is within the scope of the invention to employ other ways of measuring the electromotive force generated.

While the preferred embodiment of the invention has been specifically illustrated and described, it is to be understood that the present invention is not limited to its illustrated embodiment but may be embodied in other constructions within the scope of the following claims:

1. An electromagnetic ship's log comprising a magnet carried by the ship to project a magnetic field in the water transversely of the movement of the ship therethrough, the movement of which field through the water induces an electromotive force in the water, and means for measuring the electromotive force thus induced.

2. An electromagnetic ship's log comprising a magnet carried by the ship and moved longitudinally thereby through the water, said magnet maintaining a magnetic field, the movement of which through the water induces an electromotive force in the water, and means including electrical connections with the water near the middle of the magnet poles for measuring the eletromotive force thus induced.

3. An electromagnetic ship's log comprising a magnet carried by the ship to maintain a magnetic field in the water, the movement of which field through the water induces an electromotive force in the water, and means for measuring the electromotive force thus induced including electrodes exposed to the water, and means for preventing polarization of the electrodes.

4. An electromagnetic ship's log comprising a magnet having two or more poles placed side by side and moved longitudinally by the ship through the water, said magnet maintaining a magnetic field the movement of which through the water induces an electromotive force therein, and means including electrical connections to the water at opposite sides of one of the magnet poles for measuring the electromotive force induced in the water by the movement of the field.

5. An electromagnetic ship's log comprising a magnet having two or more long, narrow poles located side by side and carried by the ship to be moved substantially longitudinally through the water, said magnet producing a magnetic field, the motion of which through the water induces an electromotive force in the water, and means for measuring the electromotive force thus induced including electrodes exposed to the water on opposite sides of one of the magnet poles and near the middle of the magnet.

6. The method of measuring the speed of a ship relative to the water comprising moving a magnetic field with the ship through the water, and measuring the electromotive force induced in the water by the movement of the field.

CHARLES G. SMITH.
JOSEPH SLEPIAN.